US006966201B2

(12) United States Patent
DiGiovanni et al.

(10) Patent No.: US 6,966,201 B2
(45) Date of Patent: Nov. 22, 2005

(54) HIGH-TEMPERATURE SINTERING OF SOOT BODIES DOPED USING MOLECULAR STUFFING

(75) Inventors: David John DiGiovanni, Montclair, NJ (US); Kyunghwan Oh, Boon-Dang gu (KR)

(73) Assignee: Furukawa Electric North America, Inc., Norcross, GA (US)

( * ) Notice: Subject to any disclaimer, the term of this patent is extended or adjusted under 35 U.S.C. 154(b) by 427 days.

(21) Appl. No.: 10/222,247

(22) Filed: Aug. 16, 2002

(65) Prior Publication Data

US 2004/0031290 A1    Feb. 19, 2004

(51) Int. Cl.$^7$ ............................................. C03B 37/016
(52) U.S. Cl. ........................... 65/395; 65/390; 65/412; 65/399
(58) Field of Search ....................... 65/390, 395, 412, 65/419, 427, 428, 17.2

(56) References Cited

U.S. PATENT DOCUMENTS

| | | |
|---|---|---|
| 3,938,974 A | 2/1976 | Macedo et al. |
| 3,941,474 A | 3/1976 | Kitano et al. |
| 4,110,093 A * | 8/1978 | Macedo et al. ............. 65/399 |
| 4,110,096 A * | 8/1978 | Macedo et al. ............. 65/30.14 |
| 4,326,869 A * | 4/1982 | Kurosaki et al. ............. 65/412 |
| 4,389,233 A * | 6/1983 | Kurosaki et al. ............. 65/31 |
| 4,648,891 A * | 3/1987 | Abe ............................. 65/412 |
| 4,668,263 A * | 5/1987 | Yokota et al. ................ 65/412 |
| 4,749,396 A * | 6/1988 | Hicks, Jr. ..................... 65/412 |
| 4,820,322 A * | 4/1989 | Baumgart et al. ............ 65/412 |
| 5,145,507 A * | 9/1992 | Kyoto et al. .................. 65/398 |
| 5,262,365 A * | 11/1993 | Oyobe et al. ................. 501/54 |
| 5,314,518 A * | 5/1994 | Ito et al. ....................... 65/390 |
| 5,379,364 A | 1/1995 | Chandross et al. |
| 5,439,495 A * | 8/1995 | Koike et al. .................. 65/17.2 |
| 6,189,342 B1 * | 2/2001 | Berkey ......................... 65/412 |
| 6,381,986 B1 * | 5/2002 | Loxley et al. ................ 65/17.5 |
| 6,519,976 B2 * | 2/2003 | Oh ................................ 65/395 |
| 6,584,808 B1 * | 7/2003 | Roba et al. ................... 65/412 |
| 6,732,549 B1 * | 5/2004 | Lum et al. .................... 65/384 |

* cited by examiner

Primary Examiner—Steven P. Griffin
Assistant Examiner—Lisa L. Herring
(74) Attorney, Agent, or Firm—Daniel Kim, Esq.

(57) ABSTRACT

Techniques are described for fabricating a preform from a soot body. In one described technique, a soot body is loaded into a substrate tube, and the position of the soot body is stabilized within the tube. The tube is then rotated around its longitudinal axis. Heat is applied from a heat source to the substrate tube at a first end of the soot body to cause the first end of the soot body to begin to sinter and to cause the substrate tube to begin to at least partially collapse around the sintered portion of the soot body. The heat source is then advanced along the substrate tube and the soot body to cause a progressive sintering of the soot body, and to cause a progressive, at least partial, collapse of the substrate tube around the sintered portion of the soot body.

26 Claims, 8 Drawing Sheets

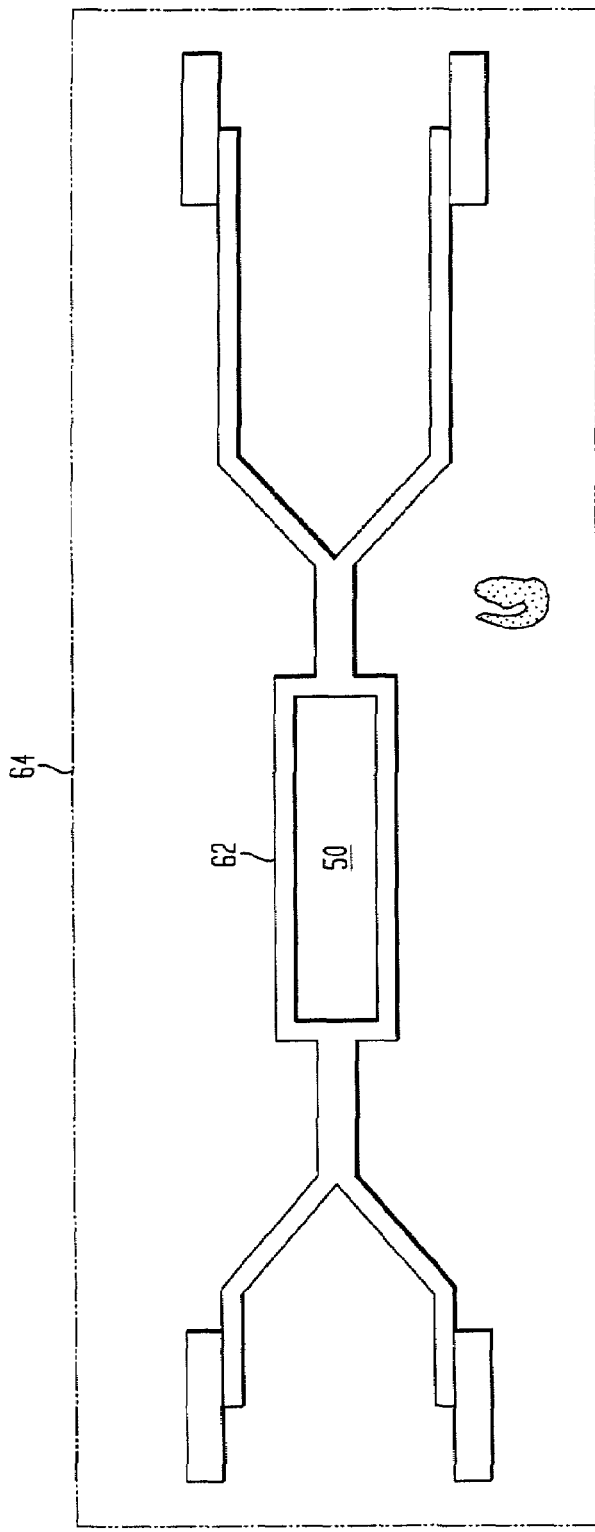
FIG. 10
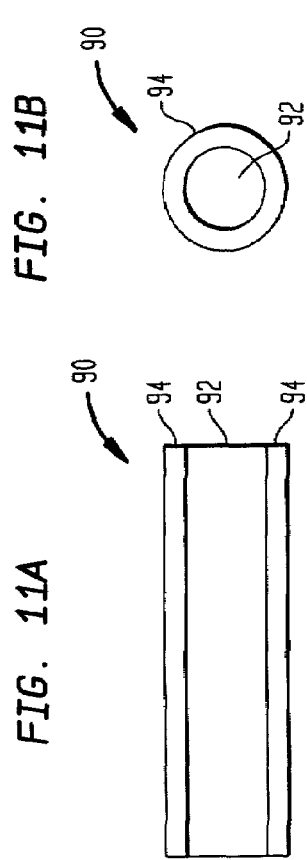
FIG. 11A
FIG. 11B

HIGH-TEMPERATURE SINTERING OF SOOT BODIES DOPED USING MOLECULAR STUFFING

FIELD OF THE INVENTION

The present invention relates generally to improvements in fabricating optical fiber and optical fiber preforms, and particularly to advantageous aspects of processes for high-temperature sintering of soot bodies doped using molecular stuffing.

DESCRIPTION OF THE PRIOR ART

Silica optical waveguides are fabricated using several techniques. In one approach, chemical vapor deposition is used to generate layers of silica soot. Modified chemical vapor deposition (MCVD) and outside vapor deposition (OVD) are primarily used for this type of optical fiber fabrication. In another approach, dopants are fixed or exchanged in a porous silica body that is prepared by phase separation followed by leaching out soluble components. This technique has been used, for example, to fabricate graded index (GRIN) lenses. In a modification of this technique, the porous silica body is fabricated using organometallic sols.

Chemical vapor deposition techniques providing glass of the highest purity are based on oxide glass precursors, which require high vapor pressures for convective delivery. Such precursors impose a fundamental limitation on the range of possible dopants, typically limiting them to germanium (Ge), phosphorus (P), boron (B), fluorine (F), and titanium (Ti). In addition, techniques for fixing or exchanging dopants in glass also have strict limitations in selection of dopants because of the nature of precipitation or ion exchange. In an ion-exchange process, only elements such as potassium (K), thallium (Ti), lithium (Li), sodium (Na), ruthenium (Ru), cesium (Cs), and silver (Ag) can be employed because of their high ion mobilities.

Prior techniques for fixing dopants into a porous body, whether uniformly or in a graded spatial profile are based on the steep change in solubility of metal salts with respect to temperature, or chemistry of solution, such as pH and composition. The precipitates are micro-crystals of metal salts filling the pores in the soot body. These techniques are highly selective with regard to dopants due to restrictive requirements in physical and chemical properties for successful molecular stuffing.

Furthermore, the above-described prior art techniques typically require the use of porous bodies consisting of multi-component silicate glass containing $Na_2O$, $B_2O_3$, or $Al_2O_3$. When these multi-component silicate glasses are fabricated into optical fiber, they typically display high signal losses due to scattering and impurities. Thus, optical waveguides fabricated from these compositions are typically used in very short segments, such as in GRIN lenses. Furthermore, these fibers are not compatible with high silica optical fibers with respect to splicing or connectorization, because of their lower melting temperatures and higher refractive indices.

In another approach, rare earth doped fibers are manufactured using a technique in which a doped, porous glass layer is created on the inside surface of a tube and is then sintered using a high temperature oxy-hydrogen torch. However, only small amounts of glass may be deposited on the inside tube surface and doped, and there is no opportunity for varying the concentration of dopant across the layer thickness, which is typically less than 1 mm.

Prior attempts at using molecular stuffing to dope sol-gel bodies have failed for a number of reasons. First, as the doping liquid dries, solute migrates to the surface of the porous body, causing a skin of high concentration to form. Also, because the sintering temperature of sol-gel materials sits in the vicinity of the maximum crystallization rate (~1,400° C.) for hours, concentrations of more than about 1% dopant cause crystallization.

Processing at higher temperatures in a furnace has not been feasible because of viscous sagging of the glass body and because of the difficulty of operating such high temperature furnaces. Also, processing with a torch was thought not to be possible because of contamination from the torch gases.

Processing of a sol-gel body inside a tube has not been previously attempted because the body typically shrinks by more than 50% in length and diameter, which causes great difficulties in subsequent processing of the body. In particular, the shrinking sol-gel body tends to stick to the surrounding glass tube, causing unwanted deformation.

SUMMARY OF THE INVENTION

Aspects of the present invention are directed to processes for fabricating a preform from a soot body. In a method according to an aspect of the invention, a soot body is loaded into a substrate tube. The substrate tube is then rotated around its longitudinal axis. Heat is applied from a heat source to the substrate tube at a first end of the soot body to cause the soot body to begin to sinter, and to cause the substrate tube to begin to at least partially collapse around the first end of the sintered portion of the soot body. The heat source is advanced along the substrate tube and the soot body to cause a progressive sintering of the soot body, and to cause a progressive, at least partial, collapse of the substrate tube around the sintered portion of the soot body. In another aspect of the invention, the soot body is first completely sintered, and the substrate tube is then collapsed around the sintered soot body in a separate step.

Additional features and advantages of the present invention will become apparent by reference to the following detailed description and accompanying drawings.

BRIEF DESCRIPTION OF THE DRAWINGS

FIG. 10 shows a diagram of the substrate tube and soot body shown in FIG. 9, in which the soot body has been completely sintered and in which the substrate tube has been collapsed around the sintered soot body.

FIGS. 11A and 11B show, respectively, side and end views of an exemplary core-cladding structure fabricated according to the method illustrated in FIG. 1.

DETAILED DESCRIPTION

According to one aspect of the invention, a glass body starts as a porous sol-gel material. The sol-gel material is soaked in a liquid solution containing a dopant precursor, and dopant is precipitated into the pores of the sol-gel material. The glass body is then dried and sintered into solid glass.

According to a further aspect of the invention, a dopant is precipitated into the pores of the sol-gel material using an acid-base reaction that occurs after the dopants have been diffused into a desired spatial distribution. Drying and sintering are accomplished inside a glass tube, which is heated to a suitably high temperature using a torch. High temperature processing tends to inhibit crystallization. As discussed above, the problem of crystallization has limited the type and amount of dopants that could be incorporated using conventional processes.

A process for doping high silica glass according to an aspect of the invention includes: (1) fabrication of a silica soot body using a conventional silica colloidal sol-gel technique, (2) precipitation of dopant into the sol-gel body using a universal acid-base reaction, and (3) consolidation and collapse of the doped sol-gel body in a glass tube at high temperature. The process allows careful tailoring of dopant concentration distribution and eliminates crystallization. A further aspect of the invention is directed to managing shrinkage of the sol-gel body so that a clear, monolithic body results.

Figure 1:
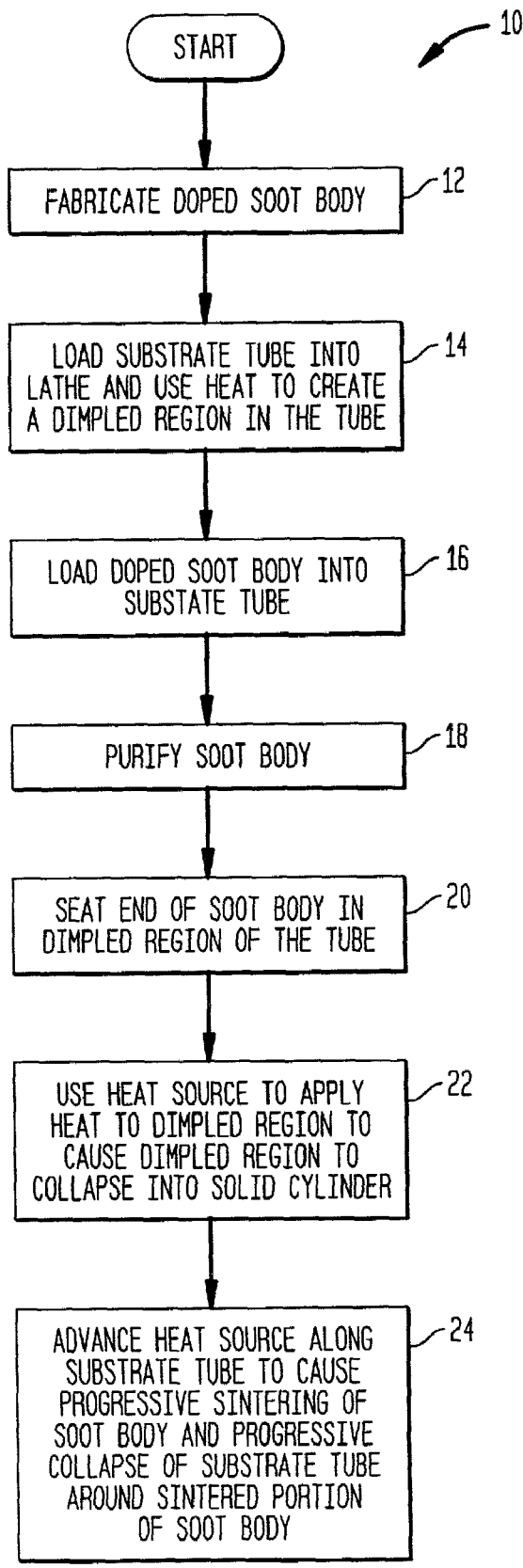
FIG. 1 shows a flowchart of a method for fabricating a preform according to a first aspect of the invention.

FIG. 1 shows a flowchart of a method 10 according to an aspect of the invention. In step 12, a doped soot body is fabricated. According to an aspect of the invention, the soot body is fabricated using a sol-gel process followed by a precipitation process. However, other techniques may be used, including vapor deposition techniques, such as vapor-phase axial deposition (VAD) or outside vapor deposition OVD. Various dopants may suitably be used, including: (a) active dopants, including rare earth dopants, such as neodymium (Nd), erbium (Er), praseodymium (Pr), Thulium (Tm), and the like; (b) index-raising dopants, such as aluminum (Al), lanthanum (La), gallium (Ga), hafnium (Hf), and the like; and (c) host modifiers, such as antimony (Sb), tin (Sn), and the like. As used herein, the term "host modifier" refers to a dopant that alters the properties of the glass or other dopants. For example, the addition of tin (Sn) dopant to a germanium-doped glass causes the glass to become more photosensitive.

In step 14, a substrate tube is loaded into a lathe, and heat is applied to the tube to create a dimpled region. The purpose of the lathe is to rotate the substrate tube around its longitudinal axis during the heating process. The purpose of the dimpled region is to stabilize the position of the soot body in the substrate tube. However, other techniques may be used to rotate the substrate tube and to stabilize the position of the soot body, without departing from the spirit of the invention. In step 16, the soot body is loaded into the tube. In step 18, the soot body is purified within the tube. In step 20, one end of the soot body is seated in the dimpled region of the tube. In step 22, a heat source is used to apply heat to the dimpled region of the substrate tube to cause the dimpled region to collapse into a solid cylinder. In step 24, the heat source is advanced along the substrate tube to cause a progressive sintering of the soot body, and to cause a progressive collapse of the substrate tube around the sintered portion of the soot body. In another aspect of the invention, the soot body is first completely sintered, and the substrate tube is then collapsed around the sintered soot body.

A preform is formed having the sintered soot body as its core and the collapsed substrate tube as a cladding layer. The heat applied to the substrate tube and soot body is at a temperature that is sufficiently high to prevent crystallization during the sintering process. In some cases, it may not be desirable to use the collapsed substrate tube as a cladding layer. In these cases, the tube material may be removed using a suitable technique, including conventional grinding or etching techniques or the like.

Figure 2:
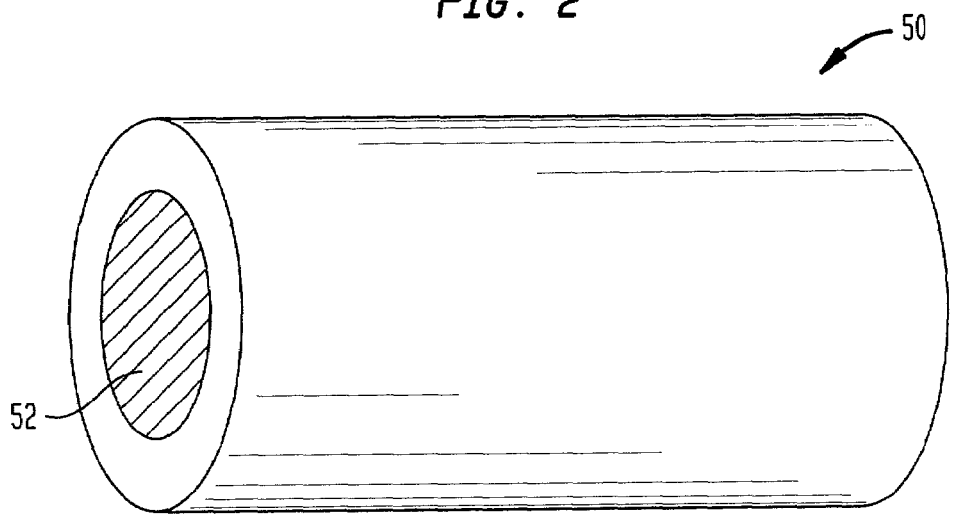
FIG. 2 shows a diagram of a porous soot body suitable for use in the method illustrated in FIG. 1.

FIG. 2 shows a diagram of an exemplary soot body 50, prepared from a silica powder colloidal suspension using a conventional sol-gel process. As shown in FIG. 2, the soot body 50 is cylindrical in shape, and includes a central opening 52 extending down its length. The central opening 52 is closed during subsequent processing of the soot body 50. Depending upon the dimensions of the soot body 50, it may be possible to eliminate the central opening 52 without departing from the spirit of the invention. Also, it should be noted that other shapes may be used for the soot body 50 without departing from the spirit of the invention. For example, it would be possible to practice the present invention using a soot body and substrate tube having rectangular profiles.

Organic binding material in the soot body 50 is burned out by applying heat to the soot body 50 using a furnace, or other suitable heating device. After burnout of the organic binding material, the silica soot body 50 is aged in water vapor to strengthen it. By preparing silica soot body 50 in this manner, volatile elements and transition metals that cause bubbles and optical attenuation are kept to a minimum.

Figure 3:
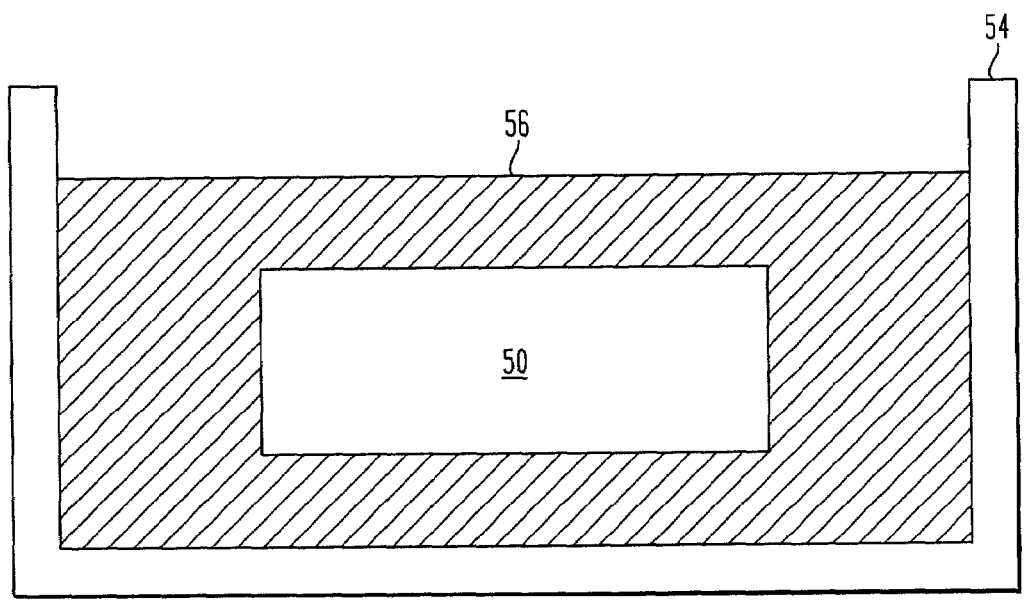
FIG. 3 shows a diagram of the porous body shown in FIG. 2 placed in a vessel for soaking in a solution according to the method illustrated in FIG. 1.

The porous silica soot body 50 is then doped using a molecular stuffing technique. As illustrated in FIG. 3, the soot body 50 is placed in a vessel 54 and soaked in a liquid solution 56 to permeate the body with a dopant precursor, and then the dopant is precipitated into the soot body. The precipitation may be accomplished using an acid-base reaction, a thermal process, or other suitable technique. The use of an acid-base reaction allows a wide selection of dopants, including dopants that may be unsuitable for use with other doping techniques.

Exemplary methods of molecular stuffing include the following:

(a) Metal chloride aqueous solution and $NH_4OH$ solution. The soot body 50 is first soaked in a metal chloride aqueous solution. After soaking, the body 50 is then immersed in a solution containing $NH_4OH$. Direct reaction between chlorides and hydroxide forms dopant precipitates in the body 50.

(b) Metal chloride and urea aqueous solution. The soot body 50 is soaked in a metal chloride and urea $((NH_2)_2CO)$ aqueous solution. Subsequently heating the soaked body causes the urea to decompose, which increases the pH to form dopant precipitates in the body 50.

(c) Metal oxides in KOH or NaOH solution with ester. The soot body 50 is soaked in a solution of metal oxides in potassium hydroxide (KOH) or sodium hydroxide (NaOH) with an ester. Subsequently heating the solution causes the ester to decompose, which decreases the pH to form dopant precipitates in the body 50.

Precipitates formed in the above step may include oxychlorides and hydroxides, as well as oxides. Such compounds may produce vapors upon subsequent heating, so an additional step entailing further reaction using a liquid oxidizer such as hydrogen peroxide ($H_2O_2$) may be used.

Figure 4:
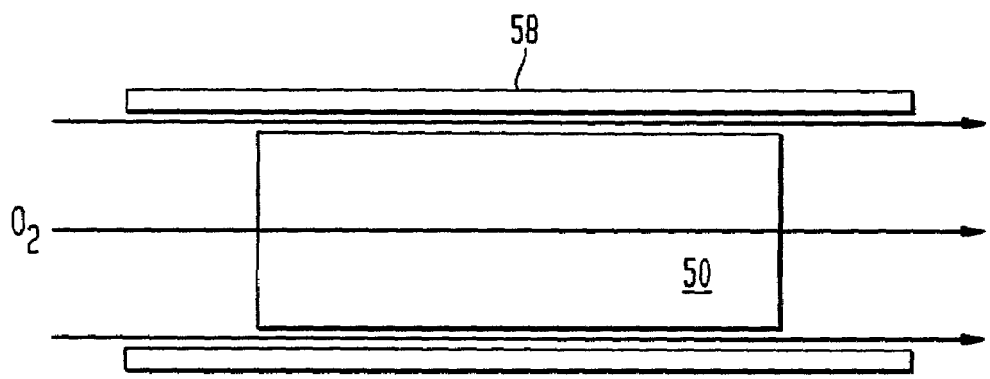
FIG. 4 shows a diagram of the porous body shown in FIG. 2 placed in a drying tube.
Figure 5:
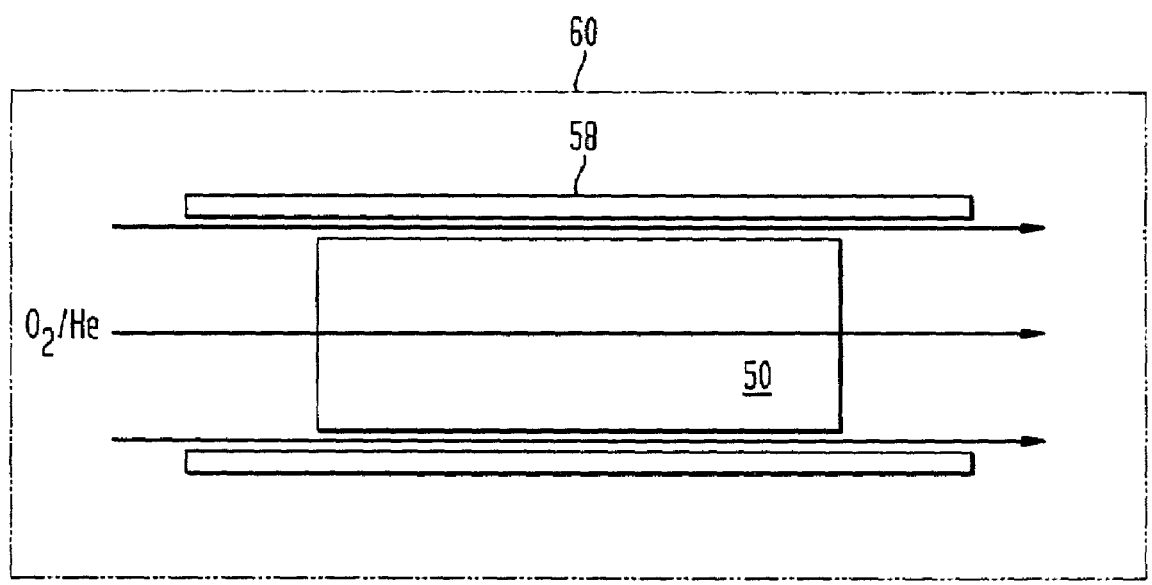
FIG. 5 shows a diagram of the porous body and drying tube shown in FIG. 4 placed inside a furnace for further drying.
Figure 6:
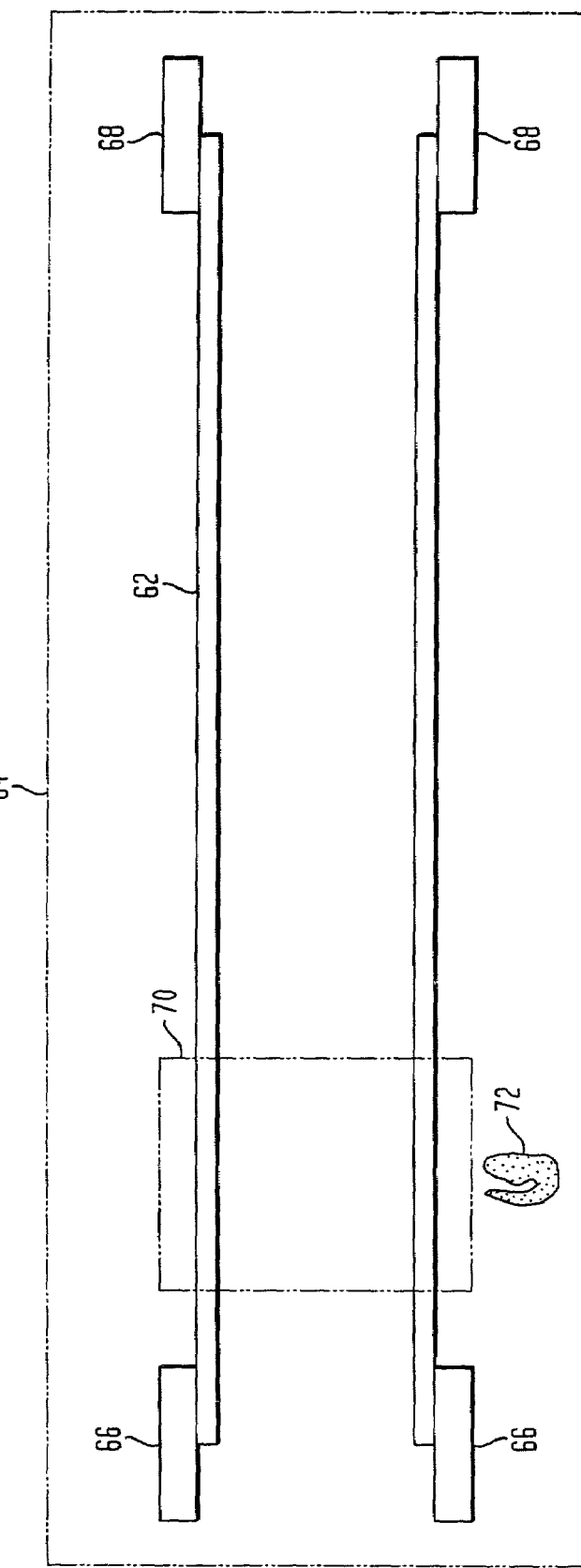
FIG. 6 shows a diagram of a substrate tube loaded into a glassworking lathe according to a further aspect of the invention.

The wet soot body 50 is removed from solutions and put into glass tubing. FIG. 4 shows a diagram of the soot body 50, which has been placed inside a closely fitting glass tube 58, where the solvent is slowly evaporated at room temperature. As illustrated in FIG. 5, after an initial drying period, the soot body 50 and drying tube 58 are placed in a furnace 60 for additional drying. As shown in FIGS. 5 and 6, gases are passed through the drying tube in both drying phases. As described below, according to one aspect of the invention, dry oxygen is passed through the tube 58 in the room temperature phase, and a mixture of oxygen and helium is passed through the tube 58 in the furnace drying phase.

Subsequent processing of the soot body takes place inside of a substrate tube that fits closely around the soot body. According to an aspect of the invention, the substrate tube is fabricated from a glass material that, as described below, is used to form an outer cladding layer of the finished preform. The substrate tube may be doped, if desired.

FIG. 6 shows a diagram of an exemplary substrate tube 62 that has been loaded horizontally into a glassworking lathe 64. The purpose of the lathe is to rotate the substrate tube 62 around its longitudinal axis as it is heated. Other techniques may be used to rotate the substrate tube 62 without departing from the spirit of the invention. For gas delivery, an airtight rotary seal 66 is attached to a first end of the substrate tube 62 and an exhaust 68 is attached to a second end of the tube 62. A hot zone 70 is formed by a heat source 72. As described below, the hot zone 72 is advanced along the substrate tube 62 in a controlled manner by manipulating the position of the heat source 70 relative to the substrate tube 62. The heat source may be suitably provided by an oxyhydrogen torch. However, other heat sources may be used, including resistive or inductive furnaces and the like.

Figure 7:
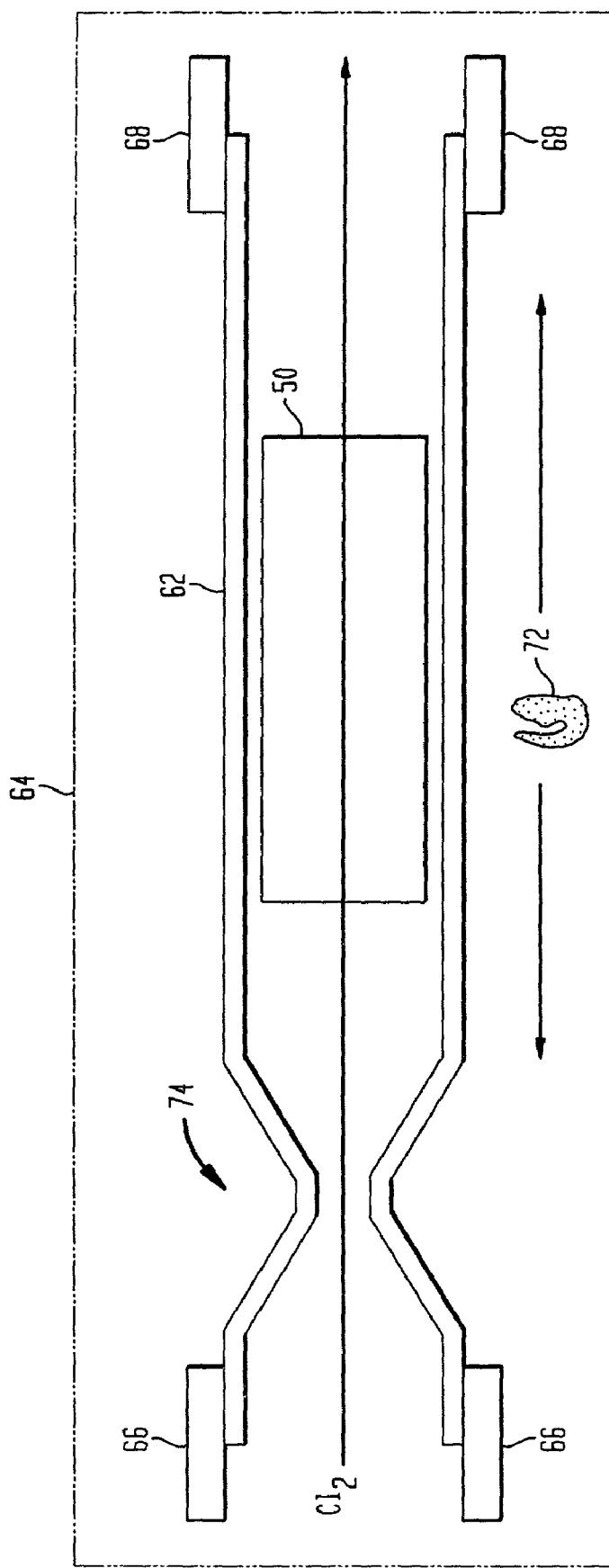
FIG. 7 shows a diagram of the FIG. 6 substrate tube that has been dimpled and loaded with a soot body according to a further aspect of the invention.

FIG. 7 shows a diagram of the substrate tube 62 with a soot body 50 loaded therein. A dimpled region 74 has been formed in the substrate tube 62 by rotating the tube 62 and heating it to a temperature sufficient to cause a portion of the tube 62 to soften. As mentioned above, the purpose of the dimpled region 74 is to stabilize the position of the soot body 50 within the substrate tube 62. However, other techniques may be used to stabilize the position of the soot body 50 without departing from the spirit of the invention.

Surface tension causes the softened portion of the tube 62 to narrow and form a waist 76 in the dimpled region 74. As shown in FIG. 7, the dimpled region 74 is not closed up entirely. A small passageway is maintained through the waist 76 to allow a purification gas to be passed through the tube 62. The purification gas may suitably be a halide, such as chlorine gas ($Cl_2$). At this stage in the process, the position of the soot body 50 within the substrate tube 62 is not fixed.

The soot body 50 is now purified. The soot body 50 and substrate tube 62 are heated to about 700° C. by scanning the heat source 72 back and forth along the substrate tube 62 and soot body 50. Heating the soot body 50 fully oxidizes the dopants therein, thereby fixing them spatially, and with low vapor pressure, so that the dopants do not vaporize during subsequent processing. Dehydration and removal of transition metals can be achieved by flow of a purification gas, such as chlorine or other halide, at a suitable temperature range depending on the composition of dopants.

In the next phase of the process, the soot body 50 is sintered, and the substrate tube 62 is collapsed around the soot body 50. In this phase of the process, the purification gases are cut off, and the soot body 50 is seated in the dimpled region 74. If necessary, a tamping rod may be inserted into the substrate tube 62 to position the soot body 50. Once the soot body 50 has been properly seated, the oxy-hydrogen torch is then positioned under the waist 76 of the dimpled region 74.

In the examples described below, sintering begins to take place at about 1,300° C. to 1,400° C. Collapsing the substrate tube requires a temperature of approximately 2,200° C. to 2,300° C. When the substrate tube 62 and soot body 50 are heated to a temperature sufficient to cause the substrate tube 62 to collapse, the sintering of the soot body 50 takes place at a faster rate than the collapse of the substrate tube 62. Thus, as the heat source 72 is advanced along the substrate tube 62 and soot body 50, the sintered portion of the soot body 50 will lead the collapsed portion of the substrate tube 62.

Figure 8:
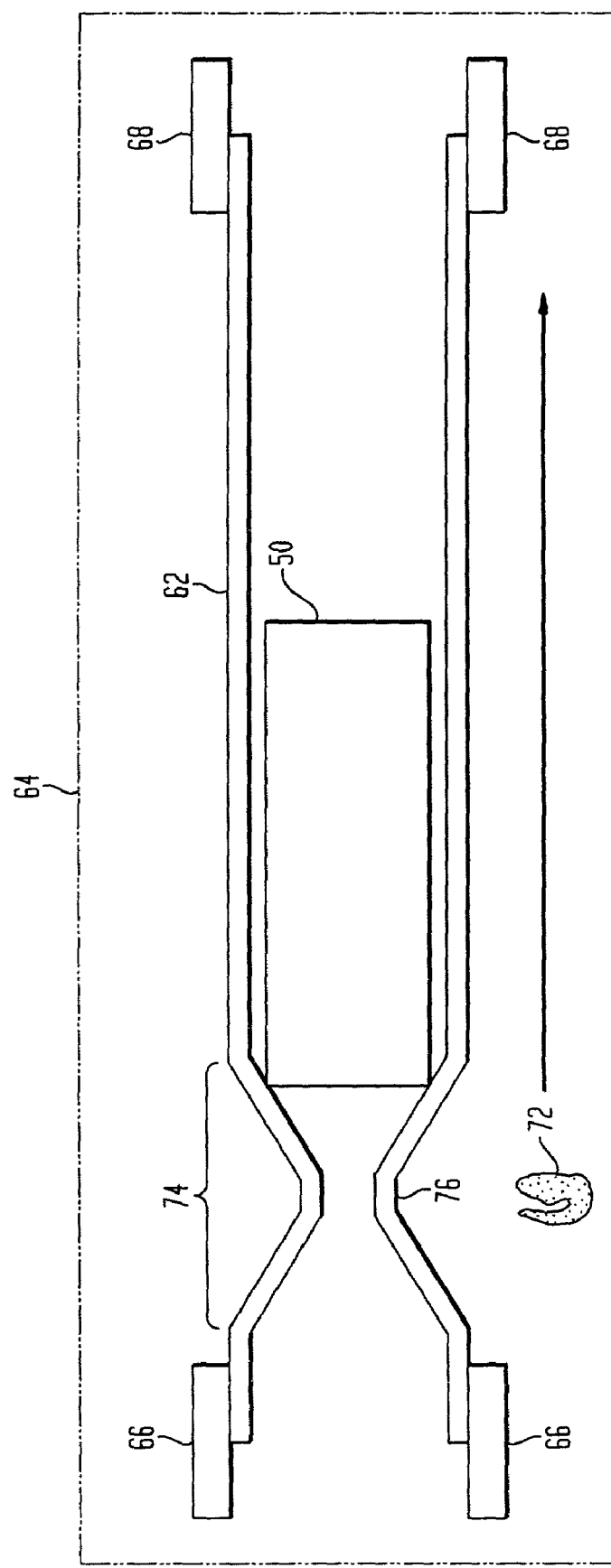
FIG. 8 shows a diagram of the substrate tube and soot body shown in FIG. 7, with the soot body seated in the dimpled region.

Returning to FIG. 8, the waist 76 of the dimpled region 74 is heated to a temperature that is sufficient to soften the waist 76 and to cause it to collapse into a solid cylinder. The heat source 70 is advanced slowly enough to cause a continuous, progressive collapse of the substrate tube 62. As described above, heating the substrate tube 62 to a temperature sufficient to cause it to collapse also causes the soot body 50 to sinter. As further described above, because the sintering of the soot body 50 takes place at a lower temperature than the collapse of the substrate tube 62, the sintering of the soot body 50 leads the collapse of the substrate tube 62. Thus, advancing the heat source 72 to cause a progressive collapse of the substrate tube 62 causes a progressive sintering of the soot body 50 that leads the collapse of the substrate tube 62.

Because the sintering of the soot body 50 leads the collapse of the substrate tube 62, the soot body 50 is supported by the substrate tube 62 throughout the sintering process. As described above, a soot body 50 typically experiences significant shrinkage as it is sintered. According to an aspect of the invention, the soot body 50 is sintered by advancing the heat source 72 down the length of the soot body 50. Thus, the soot body 50 is sintered progressively from one end to the other, and the shrinkage caused by the sintering process also progresses from one end of the soot body 50 to the other. A suitable velocity is chosen for advancing the heat source 72 such that, as the soot body 50 is progressively sintered, it is supported by the progressive collapse of the substrate tube 62 which, even softened, is sufficiently viscous to provide support when the assembly is rotated on the glassworking lathe. Because the collapse of the substrate tube 62 lags behind the sintering of the soot body 50, the substrate tube 62 only collapses around the sintered portion of the soot body 50.

Figure 9:
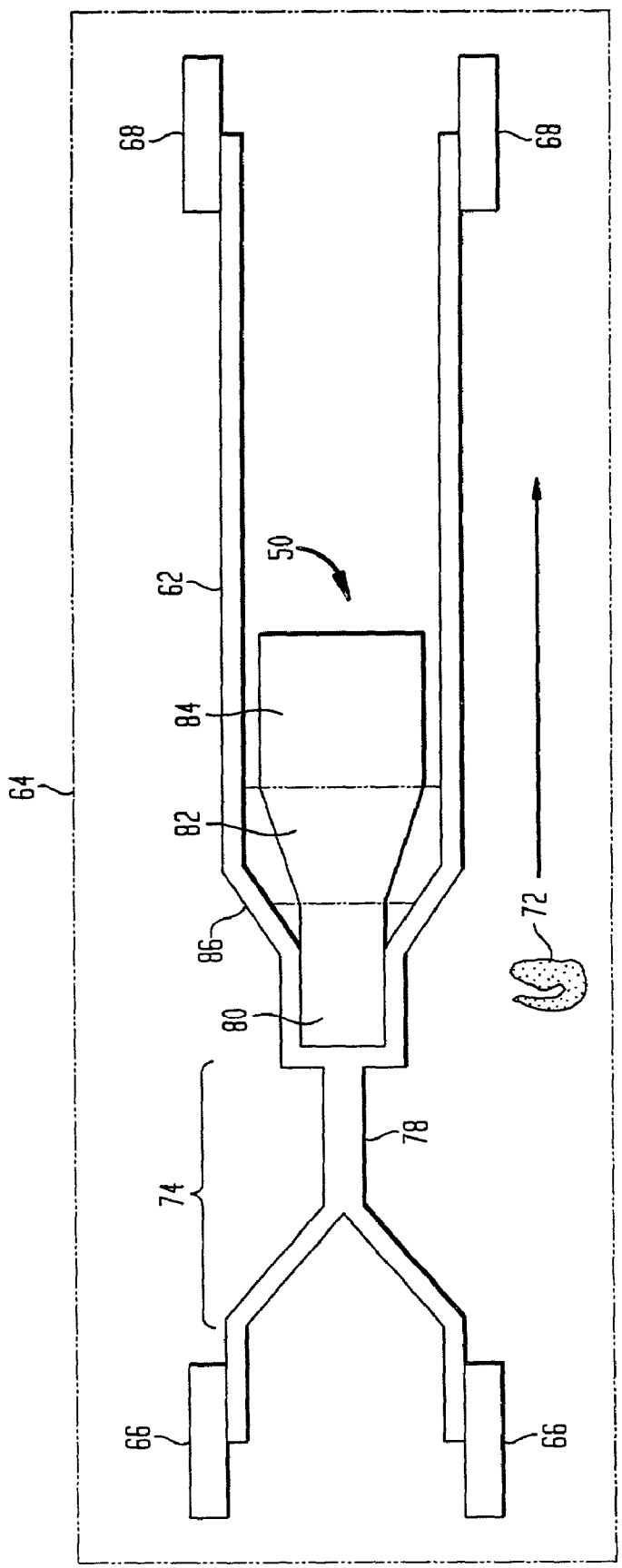
FIG. 9 shows a diagram of the substrate tube and soot body shown in FIG. 8, in which the soot body has been partially sintered and in which the substrate tube has been partially collapsed around the sintered portion of the soot body.

FIG. 9 shows a diagram of the substrate tube 62 and soot body 50 after the sintering process has begun. As shown in FIG. 9, the dimpled region 74 has collapsed into a solid cylinder. The soot body 50 includes a completely sintered portion 80, a tapered, partially sintered portion 82, and an unsintered portion 84. The substrate tube 62 has begun to collapse around the sintered portion 80 of the soot body 50.

As shown in FIG. 9, the partially collapsed portion 86 of the substrate tube 62 lags behind the partially sintered portion 82 of the soot body 50.

The collapse of the substrate tube 62 causes the interior wall of the substrate tube 62 to grip the sintered portion 80 of the soot body 50, anchoring the position of the sintered portion 80 of the soot body 50, and providing continuous support to the soot body 50 throughout the sintering process. Because the substrate tube 62 has not yet collapsed around the partially sintered and unsintered portions 82 and 84 of the soot body 50, undesirable sticking of the soot body 50 to the substrate tube 62 during the sintering process is avoided.

The velocity of the heat source is carefully monitored to maintain circularity and to avoid the formation of bubbles. A suitable velocity for the heat source varies, depending upon a number of parameters, including the materials used to fabricate the substrate tube and soot body, the dimensions of the substrate tube and soot body, the temperature of the heat source, and other factors. In the examples described below, the velocity for the heat source was on the order of 1 centimeter per minute, and was determined experimentally.

It will be appreciated that the above-described technique is not limited to soot bodies fabricated or doped using any particular technique. Further, the above-described technique may also be used to collapse a substrate tube around a soot body that has already been sintered. Where the sintering of the soot body and the collapse of the substrate tube are performed in separate steps, it may be desirable to fabricate a second dimple in the substrate tube to stabilize the position of the soot body within the substrate tube. The two dimples are formed such that there is a dimple at each end of the soot body.

FIG. 10 is a diagram in which the soot body 50 has been completely sintered, and the substrate tube 62 has been collapsed around the sintered soot body 50. Once the process has been completed, the substrate tube and sintered body are removed from the lathe and then finished. FIG. 11A shows a diagram of a preform 90 that has been fabricated by trimming the sintered soot body 50 and collapsed substrate tube 62. The preform 90 is a cylinder comprising a core of doped glass 92 surrounded by a cladding layer 94. The core 92 is formed by the sintered soot body 50, and the cladding 94 is formed by the collapsed substrate tube 62. If desired, the outer layer 94 formed by the substrate tube 62 may be removed. As mentioned above, it would also be possible to use the present invention to fabricate a preform having a shape other than a cylinder. For example, it would be possible to use the present invention to fabricate a preform having a rectangular profile.

The use of a substrate tube 62 prevents contamination of the soot body 50, for example, by hydrogen from the oxy-hydrogen torch. Also, as mentioned above, even when softened by the applied heat, the substrate tube 62 is sufficiently viscous to prevent sagging of the soot body during the sintering process. Further, the relatively high heat applied by the oxy-hydrogen torch serves to prevent crystallization in the soot body 50 during the sintering process.

The following are examples of processes according to the present invention, and are not meant to be the only processes covered by the invention.

EXAMPLE 1

A porous silica body was prepared using a sol-gel process, such as the process described in U.S. Pat. No. 5,379,364. The body was heated to between 100° C. and 500° C. for about 10–30 hours to burn out organic binders in the porous body, and was then aged in water vapor for 120 hours. The average porosity and pore diameter of the soot body were estimated to be 40–50% in weight and 30–50 nm, respectively.

The soot body was then soaked in a solution of 10–40 g of $SbCl_3$, dissolved in 50 ml of 2-propanol, 30 ml of $H_2O$, and 20 ml of HCl (35–38 weight percent). The body was immersed in this solution for between 24 and 72 hours and then immersed in an $NH_4OH$ solution for about 24 to 72 hours to precipitate the dopant. To insure complete oxidation, the body was then immersed in 30% peroxide solution in an elevated temperature of 60–100° C. for 10–30 hours.

The wet body was removed from solution and put into a glass tube having an outer diameter of about 28 mm and an inner diameter of about 20 mm. Solvent was slowly evaporated in a dry oxygen flow at room temperature, and the tube was then heated in a resistance furnace at a rate between 50° C. and 100° C. per hour from room temperature to 700° C. in a mixture of dry oxygen and helium for 10 to 70 hours.

The dried soot body was then removed from the glass tube and moved to a substrate quartz tubing sized so that the gap between the soot body and the inside surface of the quartz tube was approximately 1 mm. The quartz tube was then placed horizontally on a glassworking lathe, and an airtight rotary seal was attached to one end of the tube for gas delivery. The other end was connected to exhaust. A hot zone was formed by traversing an oxy-hydrogen torch along the soot body while rotating the tube at about 20–60 rpm. The body was heated within the quartz tube from 500° C. to 1,600° C. in a gaseous flow composed of oxygen and helium. The composition of the gas flow was optimized to remove bubbles trapped in the pores. Dehydration and removal of transition metals could have been done at this point by chlorine flow at an appropriate temperature range depending on the composition of dopants. At this temperature range, the body sintered into clear, pore-free glass. In order to prevent deformation due to shrinkage during the sintering process, the substrate tube was dimpled at both ends of the silica body to serve as supports.

After sintering, the substrate tube was collapsed around the doped body to form a solid core-cladding structure. This was done using an oxy-hydrogen torch at approximately 2,000 to 2,400° C. To remove air bubbles trapped between the sintered body and substrate tube inner surface, a vacuum is applied in the final sealing process.

Once the preform is made, conventional techniques such as elongation and overjacketing could be applied to achieve a desired geometrical structure.

EXAMPLE 2

A porous silica body was prepared as described in the above example. The body was soaked in a solution composed of: 10–40 g of $SbCl_3$, 7–28 g of urea dissolved in 50 ml of 2-propanol, 30 ml of $H_2O$, and 20 ml of HCl (35–38 weight percent). In order to prevent precipitation in the solution, the pH of the solution was adjusted to be in the range 2–4 at room temperature.

The sample was immersed in the solution for 24 hours at room temperature and the body and solution were heated to 80–100° C. for 48 hours. At this elevated temperature range urea decomposed into $NH_4$ radicals to increase pH of the solution in individual pores.

In this case, precipitation based on the acid-base reaction occurred on the scale of individual pores to result in better control of dopants. The wet body was removed from the solution and put into a 28×20 mm glass tube.

The post processing was similar to Example 1.

EXAMPLE 3

A porous silica body was prepared as described in the Example 1. The body was soaked in a solution composed of: 1–4 g of $Sb_2O_3$, in 50 ml of 2-propanol, 40 ml of KOH (3 weight percent), 10 ml of methyl formate. In order to prevent precipitation in the solution, the pH of the solution was adjusted to be in the range of 6–7 at room temperature.

To saturate the permeation the sample was immersed in the solution for 24 hours at room temperature and the body and solution were heated to 80–100° C. for 72 hours. At this elevated temperature range ester, methyl formate, decomposed to decrease pH of the solution in individual pores. In this case, precipitation based on the acid-base reaction occurred on the scale of individual pores, which provides better control of dopants. The wet body was removed from solution and put into a 28×20 mm glass tube.

The post processing was similar to Example 1.

While the foregoing description includes details which will enable those skilled in the art to practice the invention, it should be recognized that the description is illustrative in nature and that many modifications and variations thereof will be apparent to those skilled in the art having the benefit of these teachings. It is accordingly intended that the invention herein be defined solely by the claims appended hereto and that the claims be interpreted as broadly as permitted by the prior art.

We claim:

1. A method for fabricating a preform comprising:
   (a) doping a soot body by using an acid-base reaction to precipitate a dopant into the soot body, step (a) including:
      (a1) soaking the soot body in a metal chloride aqueous solution containing a dopant precursor;
      (a2) allowing the dopant precursor to permeate the soot body; and
      (a3) immersing the soot body in a solution containing ammonium hydroxide to cause dopant from the dopant precursor to precipitate into the soot body;
   (b) loading the doped soot body into a substrate tube;
   (c) stabilizing the body's position in the substrate tube;
   (d) rotating the substrate tube around its longitudinal axis;
   (e) applying heat from a heat source to the substrate tube at a first end of the body to cause the first end of the soot body to begin to sinter, and to cause the substrate tube to begin to at least partially collapse around the first end of the soot body; and
   (f) advancing the heat source along the substrate tube and the body to cause a progressive sintering of the body, and to cause a progressive, at least partial, collapse of the substrate tube around the body, the progressive sintering of the body leading the progressive collapse of the substrate tube.

2. The method of claim 1, wherein the step of using an acid-base reaction to precipitate a dopant into the soot body includes:
   soaking the soot body in a liquid solution containing a dopant precursor;
   allowing the dopant precursors to permeate the soot body; and
   using a change in pH to cause dopant from the dopant precursor to precipitate into the soot body.

3. The method of claim 2, wherein the step of using an acid-base reaction to precipitate a dopant into the soot body includes:
   soaking the soot body in a metal chloride aqueous solution; and
   immersing the soot body is immersed in a solution containing ammonium hydroxide.

4. The method of claim 1, wherein the metal chloride aqueous solution is an antimony chloride solution.

5. The method of claim 4, wherein the antimony chloride solution comprises about 10–40 grams of antimony chloride dissolved in approximately 50 ml of 2-propanol, 30 ml of water, and 20 ml of hydrochloric acid, 35–38 weight percent.

6. The method of claim 5, wherein the soot body is soaked in the antimony chloride solution for 24–72 hours, and wherein the soot body is immersed in the ammonium hydroxide solution for 24–72 hours.

7. The method of claim 1, wherein to step of doping a soot body includes doping the soot body with an active dopant.

8. The method of claim 1, wherein the step of doping a soot body includes doping the soot body with an index-raising dopant.

9. The method of claim 1, wherein the step of doping a soot body includes doping the soot body with a host modifier.

10. The method of claim 1, further including, prior to step (a):
    fabricating the soot body using a sol-gel process.

11. The method of claim 1, further including, prior to step (a):
    fabricating the soot body using a vapor deposition process.

12. The method of claim 1, wherein the step of rotating the substrate tube around its longitudinal axis including mounting the substrate tube into a lathe.

13. The method of claim 1, wherein the step of stabilizing the body's position in the substrate tube includes forming a dimple in the substrate tube and seating a first end of the body in the dimple.

14. The method of claim 1, further including the following step performed between steps (c) and (d):
    purifying the porous body.

15. The method of claim 14, wherein the step of purifying the soot body includes:
    applying heat to the soot body to fully oxidize dopants in the soot body; and
    causing a purifying gas to flow through the soot body.

16. The method of claim 15, wherein the purifying gas is a halide.

17. The method of claim 1, wherein step (f) includes:
    applying a vacuum to remove air bubbles trapped between the sintered body and the substrate tube inner surface.

18. The method of claim 1, further including, after step (f):
    (g) removing the collapsed tube from around the sintered soot body.

19. A method for fabricating a preform comprising:
    (a) doping a soot body by using an acid-base reaction to precipitate a dopant into the soot body, step (a) including:
       (a1) soaking the soot body in a metal chloride and urea aqueous solution containing a dopant precursor;
       (a2) allowing the dopant precursor to permeate the soot body; and (a3) heating the soaked body to decompose the urea to increase pH of the aqueous solution to cause dopant from the dopant precursor to precipitate into the soot body;
(b) loading the doped soot body into a substrate tube;
(c) stabilizing the body's position in the substrate tube;
(d) rotating the substrate tube around its longitudinal axis;
(e) applying heat from a heat source to the substrate tube at a first end of the body to cause the first end of the soot body to begin to sinter, and to cause the substrate tube to begin to at least partially collapse around the first end of the soot body: and
(f) advancing the heat source along the substrate tube and the body to cause a progressive sintering of the body, and to cause a progressive, at least partial, collapse of the substrate tube around the body, the progressive sintering of the body leading the progressive collapse of the substrate tube.

20. The method of claim 19, wherein the step of using an acid-base reaction to precipitate a dopant into the soot body includes:
    soaking the soot body in an antimony chloride and urea aqueous solution; and
    heating the soaked body to decompose the urea, thereby releasing NH4 radicals into the solution to increase the pH.

21. The method of claim 20, wherein the aqueous solution comprises about 10–40 grams of antimony chloride and 7 to 28 grams of urea dissolved in 50 ml of 2-propanol, 30 ml of water, and 20 ml of hydrochloric acid, 35–38 weight percent, and wherein the solution pH is adjusted to be in the range of 2 to 4 at room temperature.

22. The method of claim 21, farther comprising immersing the soot body in the solution for 24 hours at room temperature, and then heating the body and solution to between 80° C. and 100° C. for 48 hours.

23. A method for fabricating a preform comprising:
    (a) doping a soot body by using an acid-base reaction to precipitate a dopant into the soot body, step (a) including:
        (a1) soaking the soot body in a metal oxide containing a dopant precursor and a hydroxide with an ester; and
        (a2) allowing the dopant precursor to permeate the soot body; and
        (a3) heating the solution to decompose the ester to increase pH of the solution to cause dopant from the dopant precursor to precipitate into the soot body;
    (b) loading the doped soot body into a substrate tube;
    (c) stabilizing the body's position in the substrate tube;
    (d) rotating the substrate tube around its longitudinal axis;
    (e) applying heat from a heat source to the substrate tube at a first end of the body to cause the first end of the soot body to begin to sinter, and to cause the substrate tube to begin to at least partially collapse around the first end of the soot body; and
    (f) advancing the heat source along the substrate tube and the body to cause a progressive sintering of the body, and to cause a progressive, at least partial, collapse of the substrate tube around the body, the progressive sintering of the body leading the progressive collapse of the substrate tube.

24. The method of claim 23, wherein the metal oxide is antimony oxide, the hydroxide is potassium hydroxide, and the ester is methyl formate.

25. The method of claim 24, wherein the solution comprises about 1 to 4 grams of antimony oxide, 50 ml of 2-propanol, 40 ml of potassium hydroxide, 3 weight percent, and 10 ml of methyl formate, and wherein the solution pH is adjusted to be 6–7 at room temperature.

26. The method of claim 25, wherein the soot body is immersed in the solution for 24 hours at room temperature, and thereafter the body and solution are heated to between 80° C. and 100° C. for 72 hours.

* * * * *